Feb. 6, 1940.   H. F. MORRIS   2,189,449
ANIMAL CAGE
Filed Dec. 14, 1936
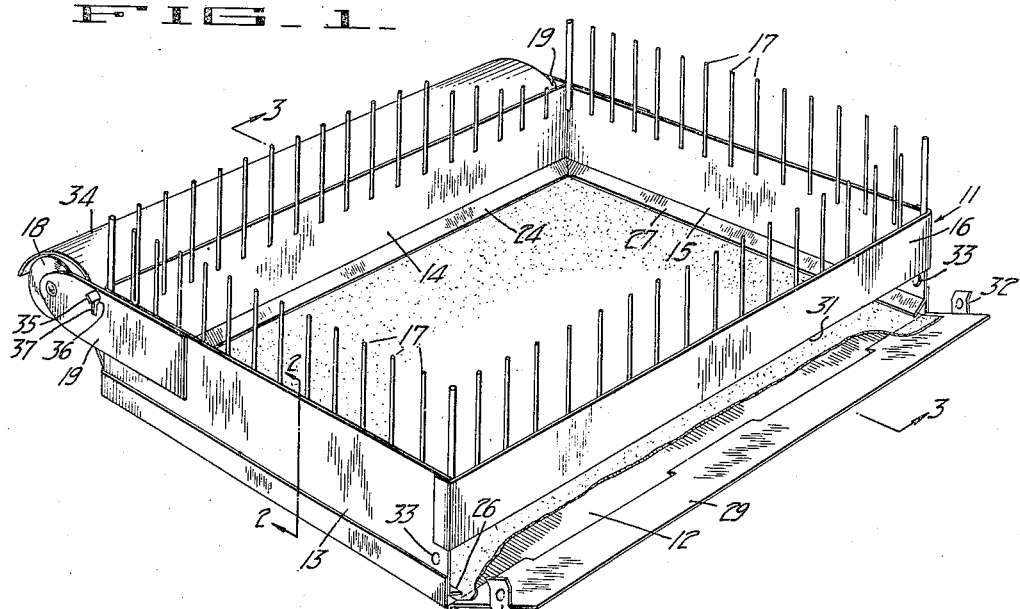
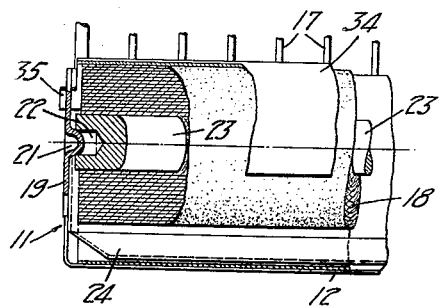
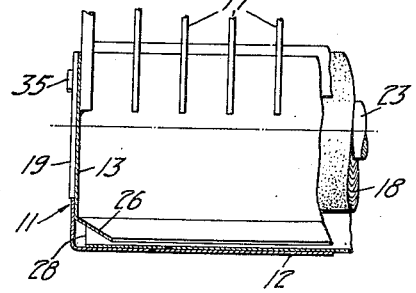
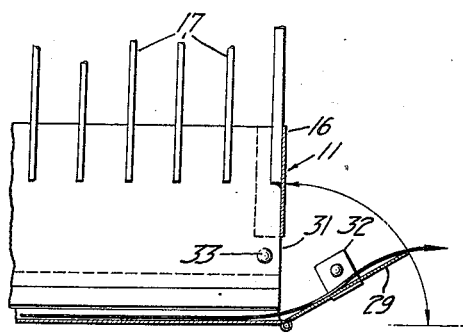
INVENTOR.
Harry F. Morris
BY Joseph B. Gardner
ATTORNEY Patented Feb. 6, 1940

2,189,449

UNITED STATES PATENT OFFICE 2,189,449

ANIMAL CAGE

Harry F. Morris, Oakland, Calif.

Application December 14, 1936, Serial No. 115,824

2 Claims. (Cl. 119—17)

The invention relates to cages for housing animals and birds, or the like, such as canaries, etc., and more particularly to the construction of the base or bottom of such cages.

As will be understood, one of the most unwelcome tasks in keeping of animals or birds in cages is the constant and periodic cleaning out of the bottom of the cages. Usually this task entails the removal of the base from the cage proper to permit a cleaning of the bottom of the cage and the renewal of a sheet of covering material which is frequently used. In accordance with the present invention and as a principal object thereof I have provided a cage of the character described in which the covering sheet at the bottom of the cage may be quickly and readily withdrawn and simultaneously replaced with a new sheet without requiring the detachment of the bottom of the cage.

Another object of the invention is to provide a cage of the character above described, in which is incorporated a replaceable pack containing a plurality of cover changes for the bottom of the cage and which may be removed and discarded one by one and to automatically leave a clean, fresh covering on the bottom of the cage upon removal of the previous covering.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perpective view of the base portion of a cage constructed in accordance with the present invention.

Figure 2 is a fragmentary transverse sectional view taken substantiially on the plane of line 2—2 of Figure 1.

Figure 3 is a cross sectional view taken substantially on the plane of line 3—3 of Figure 1.

Figure 4 is a side elevation of the pack mounting means with a portion thereof broken away and shown in section, the view being taken from a position indicated by the line 4—4 of Figure 3.

In the accompanying drawing I have illustrated a base 11 of a bird cage and which is composed of a bottom 12 and upstanding side walls 13, 14, 15 and 16. Secured to these side walls are a plurality of vertical extending wires 17 which are joined in a well known manner above the base to define the cage proper. As here shown the base is substantially rectangular so as to dispose the walls 13 and 15 substantially parallel to, and opposite from, each other and to similarly position the walls 14 and 16.

In accordance with the present invention I incorporate at one of the sides, here illustrated at 14, a pack 18 of covering material which is preferably composed of a continuous strip or blank of such material so that the same may be drawn from the pack as a continuous strip or blank over the bottom of the cage and drawn from the bottom from the opposite side 16 of the cage as renewal of the sheet is required over the bottom of the cage. The pack 18 is here illustrated in the form of an elongated roll of paper, or the like, which extends for substantially the full length of the side 14 of the base and is mounted at the exterior of this side by means of a pair of supporting members 19 which are extended from the sides 13 and 15 and are formed with a suitable engagement means 21, here shown in the form of pressed out projections, for engagement with co-acting inset portions 22 at the opposite ends of a cylindrical supporting member 23 at the center of the roll 18. As will be seen from Figure 3, the lowermost portion 24 of the side 14 is beveled inwardly and is spaced slightly from the bottom 12 of the base so as to define with the bottom a passage for the paper from the roll into the base of the cage. Preferably the lowermost portions 26 and 27 of the sides 13 and 15 are beveled inwardly adjacent the bottom 12 so as to overlie the side edges 28 of the paper and to defined with the bottom 12 a guide for insuring the smooth positioning of the paper over the bottom of the cage and to prevent matter from finding its way under the side edges of the covering sheet.

The side wall 16 of the base, opposite to the wall 14, is formed with a hinged section 29 which when lowered, as illustrated in Figure 1, leaves an opening 31 across the side 16 for the withdrawal of the covering from the cage. Preferably this section is hinged to the bottom of the cage so that when moved to a horizontal open position the same forms a continuation of such bottom. As here shown the section 29 is held in its normal vertical position, closing the opening 31, by a pair of spring clips 32 mounted at the ends of the section and which engage cooperating portions 33 on the sides 13 and 15 of the base to hold the section 29 in close position.

Preferably, in order to shield the roll of paper 18 against being wetted or soiled, a cover 34 is mounted over the roll. In the present embodiment this cover is provided with a pair of flat tongues 35 at the ends thereof which are pivotally carried in openings 36 in the roll supporting members 19. As will be seen from Figures 1 and 3, the openings 36 are formed with downwardly extending slot portions 37 which receive the tongues 35 when the cover is moved to a vertical position and temporarily hold the cover in this position. In addition to its action of covering and protecting the roll 18, the member 34 also rests directly on the periphery of the roll and is of sufficient weight as to have an appreciable holding effect on the roll and prevent the latter from loosely unwinding when portions are withdrawn therefrom into the cage.

The operation of the cage, as will be clear from the foregoing, is somewhat as follows: When it is desirable to clean the cage, the owner or attendant only has to lower the section 29 and draw the used cover portion from the open side of the base and at the same time draw onto the bottom of the cage a clean, unused covering. The used portion of the covering may then be simply severed from the portion remaining in the cage and discarded. This operation may be repeated until the paper in the roll 18 is exhausted when the roll may be simply and readily replaced with a new one by springing the members 19 slightly to remove the core member 23 and again to insert the new roll. If desired the same core member may be used with each new roll of paper.

I claim:

1. A bird cage or the like comprising, a substantially rectangular base having a bottom and up-standing side walls, a pair of members secured to the exterior of a pair of opposed side walls and adapted to rotatably support a roll of covering material at the exterior of the side wall connecting said first walls, said second named wall having a passage way adjacent said bottom for extension of said covering material into said base, exit means for said material, and a cover for said roll, means pivotally connecting said cover to said members for positioning said cover to overlie said roll and engage the periphery thereof, said means permitting the elevation of said cover and being formed to releasably lock said cover in an elevated position.

2. A bird cage or the like comprising, a substantially rectangular base having a bottom and up-standing side walls, a pair of members secured to the exterior of a pair of opposed side walls and adapted to rotatably support a roll of covering material at the exterior of the side wall connecting said pair of side walls, said connecting wall having a passageway adjacent said bottom for extension therethrough of covering material to overlie said bottom, exit means for said material at an opposite side of said base, said members being provided with aligned openings, and a hinged cover mounted between said members and having tongues rotatably supported in said openings to rotatably support said cover over and upon the periphery of said roll, said member openings being formed with contiguous downwardly extending slots for engagement with said tongues for holding said cover in elevated position spaced over said roll.

HARRY F. MORRIS.